(No Model.)
G. L. MOTTER.
LUBRICATOR.
No. 496,578. Patented May 2, 1893.
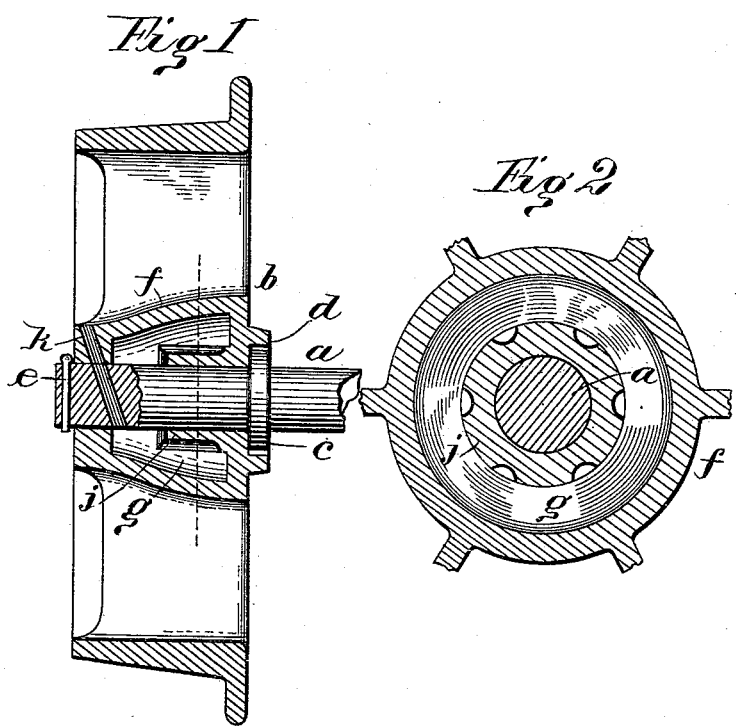

UNITED STATES PATENT OFFICE.

GEORGE L. MOTTER, OF RICH HILL, MISSOURI.

LUBRICATOR.

SPECIFICATION forming part of Letters Patent No. 496,578, dated May 2, 1893.

Application filed April 30, 1892. Serial No. 431,248. (No model.)

*To all whom it may concern:*

Be it known that I, GEORGE L. MOTTER, a citizen of the United States, residing at Rich Hill, in the county of Bates and State of Missouri, have invented certain new and useful Improvements in Car-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates more particularly to that class of car wheels used on mining cars, although it may be used in other relations, and it consists of improved means whereby the wheel is effectually and easily lubricated.

My object is to provide an oil duct or passage leading from the outside of the wheel into the oil chamber in such a manner that oil may be introduced with great facility and at the same time prevented from leaking out.

Referring to the accompanying drawings: Figure 1 represents a vertical section of a wheel embracing the essential features of my invention; Fig. 2, a section view of the hub showing the axle in cross-section.

The reference letter $a$ represents the axle which is rigidly fixed to the car, and having mounted loosely on its ends (only one of which is shown) the wheel $b$. This wheel is held in place by means of the collar $c$ which fits snugly into the external boss $d$ on the rear of the hub, and the linch pin $e$ located in the end of the axle.

The wheel which is made of an integral piece of cast steel has formed on it an enlarged hub $f$, in which the oil chamber $g$ is formed. The axle fits loosely within the hub in such a manner as to allow the wheel to turn loosely on it. Projecting from the rear of the hub and extending into the oil chamber is an annular elongated boss or projection $j$ through which the axle extends. This boss is flanged or fluted on its side and end by which the oil in the chamber is thoroughly agitated and thrown up on the axle.

Formed in the small end of the hub $f$ is a diagonally extending hole or oil passage $k$ which leads to the upper side of the axle and registers with a hole formed in the axle on a similar slant. The latter passage passes completely through the axle and empties into the lower part of the oil chamber. By means of this passage the oil chamber may be filled but only when the wheel is in the position shown by Fig. 1, for it is evident that as the passage $k$ rotates with the wheel it will only register with the passage in the axle once in each revolution, its inner side bearing on the side of the axle at other times, thus tightly closing the oil chamber and making leaking impossible. It will also appear that no dirt or grit can get into the bearings or oil.

Having thus described my invention, what I claim as new, and desire to secure by Letters Patent, is—

In a lubricating car wheel, the combination of an enlarged hub, an oil chamber formed therein, an elongated or extended bearing surface formed on the inner side of the hub in the oil chamber and having a fluted or corrugated outer surface, a diagonally extending passage formed in the hub, a second passage registering with the first formed in the axle and extending diagonally through the axle and opening into the oil chamber on the lower side of the axle, the two passages forming, when in registering position, a continuous oil conduit or passage, substantially as described.

In testimony whereof I affix my signature in presence of two witnesses.

GEORGE L. MOTTER.

Witnesses:
J. R. HALES,
J. R. HAGAN.